No. 718,589. PATENTED JAN. 13, 1903.
C. A. TREDWELL.
RETAINING DEVICE FOR FISH LINE REELS.
APPLICATION FILED JUNE 30, 1902.
NO MODEL.
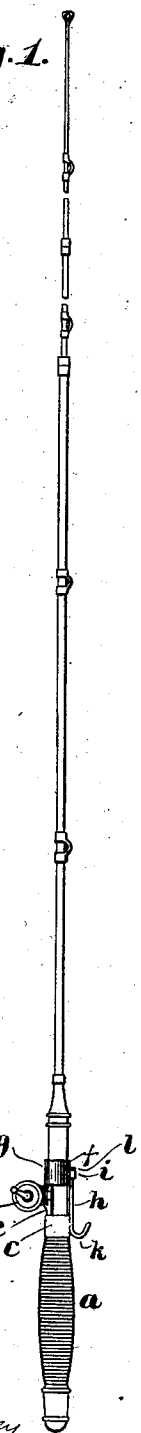
Fig. 1.
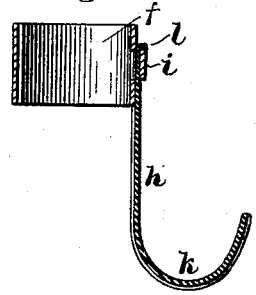
Fig. 3.
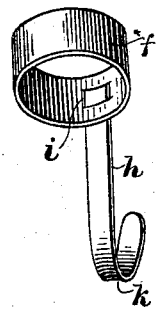
Fig. 2.
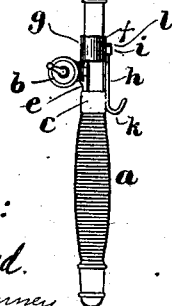
Witnesses:
Walter E. Lombard.
Mary A. Kenney.
Inventor:
Charles A. Tredwell,
by A. Hart Anderson
Atty.

UNITED STATES PATENT OFFICE.

CHARLES A. TREDWELL, OF BRISTOL, CONNECTICUT, ASSIGNOR TO THE HORTON MANUFACTURING COMPANY, OF BRISTOL, CONNECTICUT, A CORPORATION OF CONNECTICUT.

RETAINING DEVICE FOR FISH-LINE REELS.

SPECIFICATION forming part of Letters Patent No. 718,589, dated January 13, 1903.

Application filed June 30, 1902. Serial No. 113,711. (No model.)

*To all whom it may concern:*

Be it known that I, CHARLES A. TREDWELL, a citizen of the United States, residing at Bristol, in the county of Hartford and State of Connecticut, have invented certain new and useful Improvements in Retaining Devices for Fish-Line Reels; and I do hereby declare the following to be a full, clear, and exact description of the invention, such as will enable others skilled in the art to which it appertains to make and use the same.

The present invention relates to improvements in fishing-rods, and more particularly to improved means for securing a fish-line reel on a rod.

The object of the present invention is to produce a simple device which at all times will effectually retain the fish-line reel on the rod and prevent its working loose during the manipulations of the reel and rod in landing a fish.

A further object of the invention is to produce a retaining-ring for fish-line reels having a removable hook arranged to enable the angler to retain a firm grasp of the rod and at the same time effectually prevent the fish-line reel from working loose.

To the above ends the present invention consists of the retaining device for fish-line reels which will be hereinafter described, and pointed out in the claims.

The present invention is illustrated in the accompanying drawings, in which—

Figure 1 shows a fishing-rod with the reel secured thereon by my improved retaining device, and Fig. 2 shows in perspective the movable ring of my retaining device removed from the rod. Fig. 3 shows a vertical section through the movable ring and its hook.

Similar reference characters will be employed throughout the specification and drawings to designate corresponding parts.

In the drawings, $a$ represents a fishing-rod of any usual or preferred construction, and $b$ a fish-line reel secured to the butt-end of said rod. The butt-end of the rod is provided with the usual fixed ring or clip $c$, having a raised portion or loop under which one end of the plate $e$, attached to the fish-line reel, is adapted to be placed.

Coöperating with the fixed ring $c$ is a sliding ring $f$, arranged to slide along the butt of the fishing-rod $a$ and to be passed over the opposite end of the plate $e$, attached to the fish-line reel $b$.

In order to prevent the movable ring $f$ from sliding along the rod $a$ from the jars and shocks imparted to the rod $a$ and reel $b$ by their proper manipulation in landing a fish, I have provided the movable ring $f$ with a bar $h$, extending rearwardly parallel to and upon the opposite side of the rod $a$ from the reel $b$, at the lower end of which is formed a hook or finger-hold $k$, extending rearwardly a sufficient distance to be readily grasped by the forefinger of the angler when grasping the rod, thus while effectually preventing the sliding ring $f$ from moving forwardly along the rod $a$ and causing it at all times to remain in engagement with the plate $e$ of the fish-line reel $b$ at the same time assisting the angler in retaining a firm grasp of the butt-end of the rod $a$.

I am aware that it has been heretofore proposed to provide a hook permanently attached to the sliding ring, which was an inconvenient and clumsy arrangement, as the hook was in the way when it was desired to pack the rod; but in my invention the hook is detachably connected to the sliding ring $f$.

The connection between the ring $f$ and the hook $k$ may be formed in any suitable or convenient manner, the arrangement shown in the drawings being the one preferred by me; but it must be clearly understood that my invention is not limited to any particular form of detachable connection between the ring and hook. As shown in the drawings, the ring $f$ is provided with a struck-up loop $i$, opening parallel to the axis of the ring, and the bar $h$ of the ring is provided at its upper end with a stop $l$, formed by bending over the end and arranged to be brought into engagement with the loop $i$ by a downward pull on the hook and bar.

In order to detach the hook and bar, it is only necessary to push said bar upwardly through the loop $i$, turning said bar away from the ring $f$ as the hook $k$ passes through said loop $i$, all of which will be made clear by an inspection of the drawings.

Having described my invention, I claim as new and desire to protect by Letters Patent of the United States—

1. A retaining device for fish-line reels consisting of a fixed ring for engaging one end of the plate of the fish-line reel and a ring arranged to be moved along the butt-end of the rod toward and away from said fixed ring, and provided with a rearwardly-extending detachable hook, substantially as described.

2. A retaining device for fish-line reels comprising means for engaging one end of the plate of the fish-line reel, and a sliding retaining-ring for engaging the opposite end of the plate of the fish-line reel, said sliding retaining-ring provided upon its under side with a rearwardly-extending detachable plate provided at its end with a hooked finger-hold, substantially as described.

3. A retaining device for fish-line reels comprising a sliding ring, a loop carried by said ring and a hooked bar slidingly engaging said loop, substantially as described.

In testimony whereof I affix my signature in presence of two witnesses.

CHARLES A. TREDWELL.

Witnesses:
W. H. BACON,
ROGER S. NEWELL.